A. G. SHEPARD.
Tire-Tightener.
No. 197,058. Patented Nov. 13, 1877.
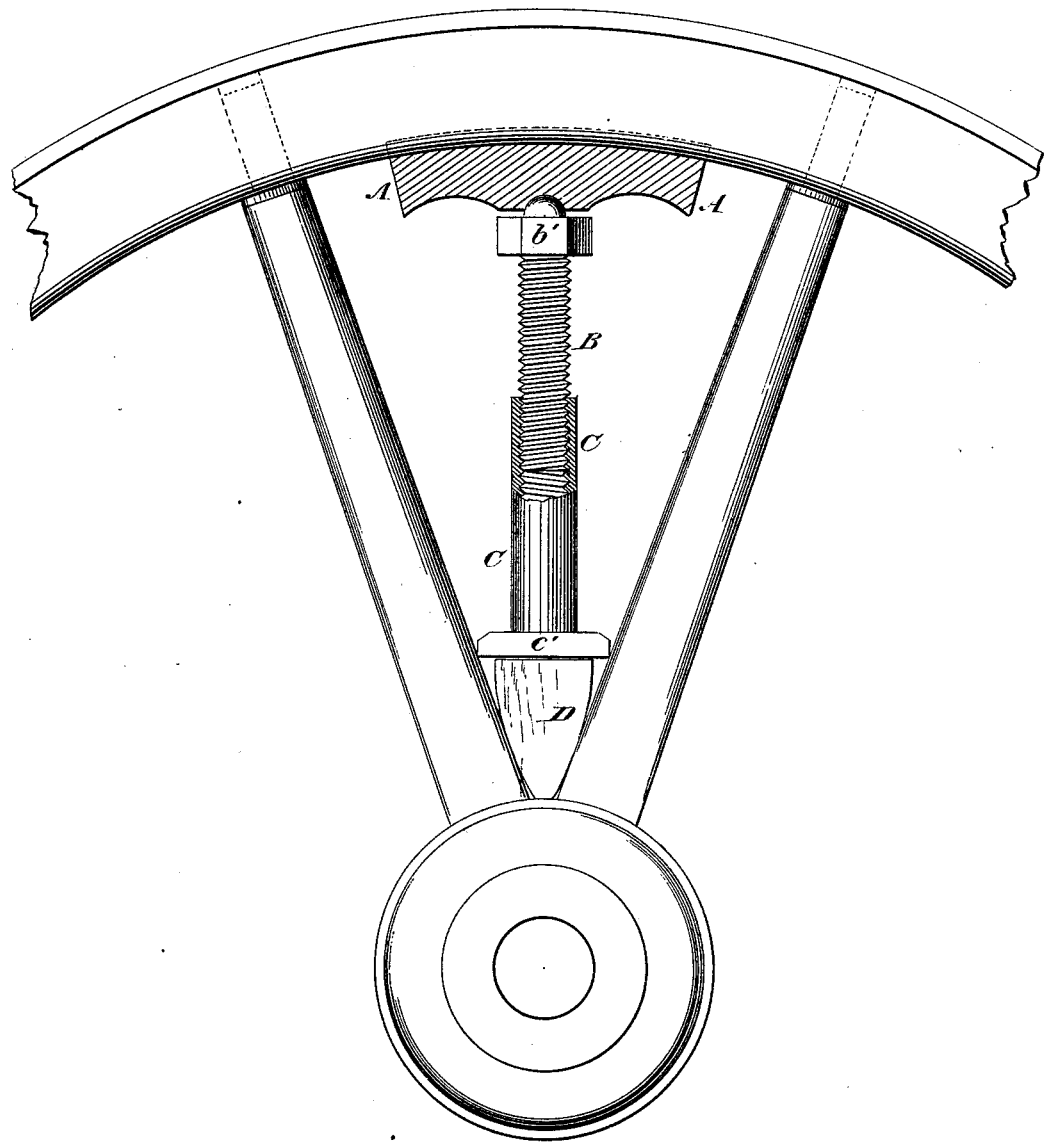

UNITED STATES PATENT OFFICE.

ABEL G. SHEPARD, OF MALVERN, IOWA.

IMPROVEMENT IN TIRE-TIGHTENERS.

Specification forming part of Letters Patent No. 197,058, dated November 13, 1877; application filed September 1, 1877.

*To all whom it may concern:*

Be it known that I, ABEL G. SHEPARD, of Malvern, in the county of Mills and State of Iowa, have invented a new and useful Improvement in Tire-Tighteners, of which the following is a specification:

The figure is a side view of my improved machine, partly in section to show the construction, and shown as applied to a wheel.

The object of this invention is to furnish an improved machine for tightening tires when upon the wheel, which shall be so constructed that it may be applied to large and small wheels with equal facility, and which shall be simple and compact in construction, inexpensive in manufacture, and effective in use.

The invention will first be described in connection with the drawing, and then pointed out in the claim.

A is the rest or bearing, which is curved and concaved upon its outer side to rest against the inner side of the felly, midway between two spokes.

In the center of the inner side of the bearing A is formed a socket to receive the pivot formed upon the outer end of the screw B. The screw B has a polygonal collar, $b'$, formed upon it, close to its outer end, to receive the wrench by which the said screw is turned. The forward end of the screw B screws into the outer end of a long nut, C, the inner end of which, or a foot, $c'$, formed upon said inner end, rests upon the base of a wedge-shaped block, D. The wedge-shaped block D is inserted between the spokes at the hub, and is so formed as to press against said spokes and cause them to bind, so that they will not be started from the hub when the screw B is turned out to expand the rim of the wheel.

By this construction the bearing A will not mar the felly, and the screw B may be turned to a greater or less distance into the nut C, so that the device can be applied to a large or a small wheel with equal facility.

Another advantage of this construction is, that the collar $b'$ to receive the wrench is formed at the outer end of the screw B, so as to give the greatest possible space for using the said wrench.

In using the device, it is applied to the wheel in the manner hereinbefore described, and the screw B is turned outward, which raises the felly off the spoke-tenons, so that a washer of metal, leather, or other suitable material can be placed upon said tenons, between their shoulders and the felly, to prevent said felly from returning to its former position, so that the rim of the wheel will be permanently expanded and the tire tightened.

Having thus described my invention, what I claim as new, and desire to secure by Letters Patent, is—

A tire-tightener consisting of felly-piece A, screw B $b'$, having rounded point at end, nut C, having foot $c'$, and the wedge D, all constructed and adapted to be applied substantially as shown and described.

ABEL G. SHEPARD.

Witnesses:
WM. E. GRAY,
W. S. LEWIS.